Sept. 14, 1948.   N. SCHNOLL   2,449,150
PORTABLE INDICATOR DEVICE FOR
ORDINARY TWO PRONG PLUGS
Filed Nov. 19, 1945   2 Sheets-Sheet 1
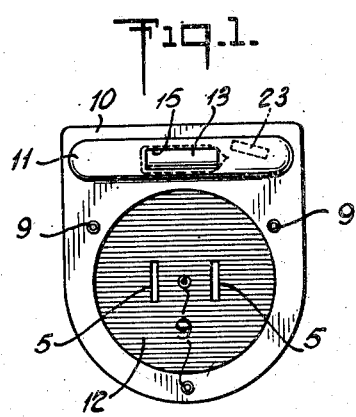
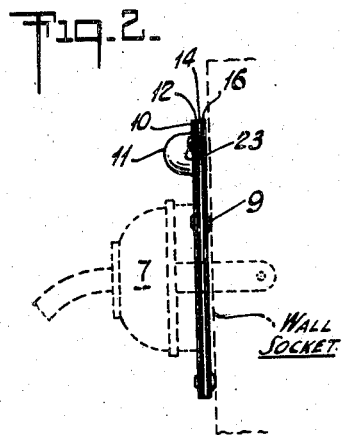
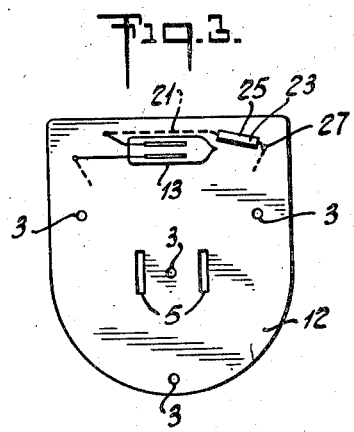
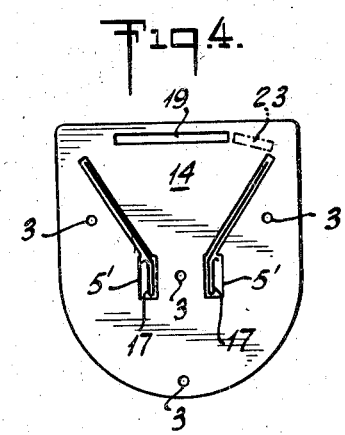
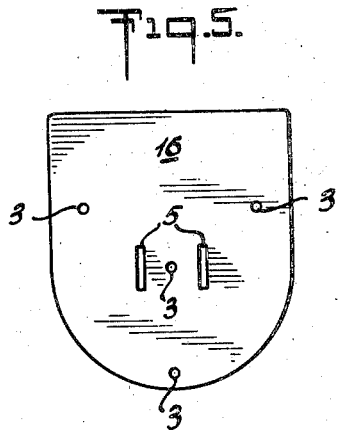
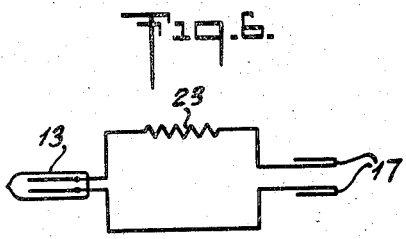
INVENTOR
NATHAN SCHNOLL.
BY
ATTORNEY Sept. 14, 1948.                    N. SCHNOLL                        2,449,150
                       PORTABLE INDICATOR DEVICE FOR
                          ORDINARY TWO PRONG PLUGS
Filed Nov. 19, 1945                                            2 Sheets-Sheet 2
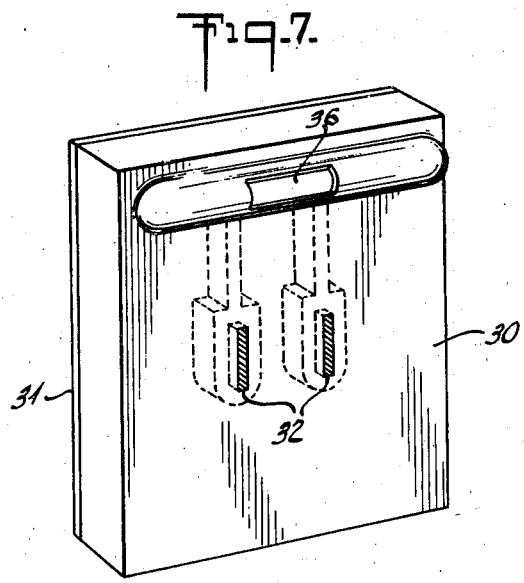
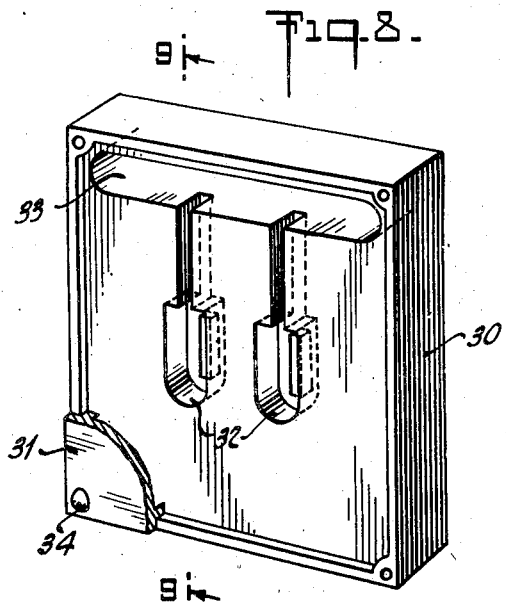
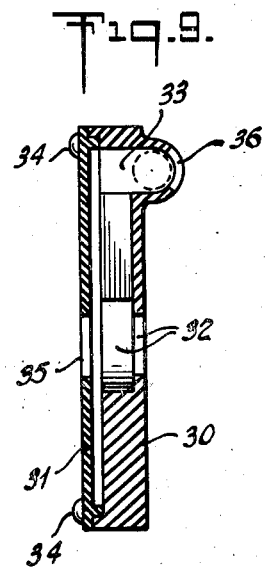
INVENTOR
NATHAN SCHNOLL.
BY Charles H. Brown
ATTORNEY Patented Sept. 14, 1948

2,449,150

UNITED STATES PATENT OFFICE 2,449,150

PORTABLE INDICATOR DEVICE FOR ORDINARY TWO PRONG PLUGS

Nathan Schnoll, Palisade, N. J.

Application November 19, 1945, Serial No. 629,429

7 Claims. (Cl. 177—311)

The invention comprises an improved lamp indicator device for indicating whether or not electrical equipment drawing power from a line, such as a soldering iron, a flat iron or the like, is operatively connected to the power supply line.

Such equipment is customarily connected to the power supply line by means of a two-conductor cord which is terminated by a plug whose prongs are inserted into a wall socket or receptacle. If heating equipment is employed, unless the user can feel the heat of the apparatus, it is difficult to determine whether or not it is receiving current. Damage is often done when the user, through forgetfulness, leaves heating equipment turned on for a long period of time.

The present invention enables a person to readily observe from a distance whether or not the electrical equipment is connected to the power supply.

Briefly stated, the indicator device of the invention comprises a small wafer-like appliance adapted to be placed between the cord plug and the wall socket. This indicator device is equipped with a small glow lamp which lights up whenever the cord plug is receiving current from the wall socket. The terminals of the glow lamp are connected to a pair of contact springs positioned in two spaced slots through which the prongs of the cord plug are adapted to pass.

Some of the advantages of the invention are: The indicator device is a unit separate and apart from the electrical equipment with which it is to be used and can be readily attached or removed from the equipment; it is thin, occupies very little space and is unnoticeable when in use except for small glow lamp; it is simple in construction, consists of a few parts and can be manufactured cheaply; it can be used with any standard cord plug; and it furnishes a positive indication that current is being supplied to the cord plug.

The following is a detailed description of the invention in conjunction with a drawing, wherein:

Fig. 1 illustrates a full size front elevation view of one embodiment of the indicator device of the invention;

Fig. 2 illustrates a side view of the device of Fig. 1, in solid lines, and shows how it is to be used with a standard cord plug and wall outlet socket;

Figs. 3, 4 and 5 illustrate the details of the three insulating wafers employed in the construction of the device of Figs. 1 and 2, in association with the glow lamp and contact spring elements;

Fig. 6 illustrates the electrical circuit of the indicator device of the invention;

Fig. 7 is a front perspective enlarged view of another embodiment of the invention;

Fig. 8 is a rear perspective view of Fig. 7 with the back plate broken away; and Fig. 9 is a vertical section taken along the line 9—9 of Fig. 8.

Throughout the figures of the drawing, the same parts are represented by the same reference numerals.

Referring to Figs. 1 to 5 of the drawing in more detail, the indicator device comprises a thin metallic face plate 10 and three thin insulating wafers 12, 14 and 16 secured together as a single unit by eyelet rivets 9. The metallic face plate 10 has a large circular aperture therein through which the first insulating wafer 12 is visible. This circular aperture has a diameter which is larger than the diameter of the standard plug 7 shown in dotted lines in Fig. 2. The upper part of the metallic face plate is provided with a hollow outwardly bulging portion 11 for accommodating a small glow lamp 13 viewable through a window or slot 15.

The insulating wafers 12, 14 and 16 may be made of any suitable material, such as Bakelite or hard rubber. The outer wafers 12 and 16 are each provided with a pair of spaced narrow slots 5 and four rivet or eyelet holes. The slots 5 appear on opposite sides of the center line of the device and have such dimensions and are so spaced that the prongs of a standard plug can be inserted into them. By way of example, the slots 5 may be spaced one-half inch apart from center to center, and have a length of one-quarter inch and a width of one sixteenth inch.

The central insulating wafer 14 is also provided with four rivet holes 3, and with a pair of spaced slots 5'. Slots 5' start from near the top of the wafer 14 and converge until they are about one-half inch apart from center to center, and terminate in substantially rectangular shaped vertical slots which are larger than the slots 5 of the wafers 12 and 16.

Slots 5' of wafer 14 are designed to accommodate a pair of contact springs 17. The bottoms of these springs are folded back on themselves so as to tightly engage the prongs of the plug 7 as the prongs pass therethrough and make good electrical contact therewith. The dimensions of the rectangular-shaped portions of slots 5' are such as to permit the bottom part of the springs to yield sideways as the prongs of the plug pass.

The upper part of wafer 14 is provided with another slot 19 which serves as a passageway for a connecting lead 21 extending from a point near one of the contact springs 17, let us say the right hand one, to one electrode of the glow lamp 13. Note Figs. 3 and 4.

The glow lamp 13 comprises a sealed glass envelope containing therein an inert gas, such as argon or neon, and a pair of electrodes. This lamp is located inside the bulging portion 11 of the metallic face plate and upon the insulating wafer 12. The electrodes of the lamp are connected to different contact springs 17. One of these lamp electrodes is connected through its associated connecting lead 21 to a terminal of a high resistor 23 adapted to fit into a small slot 26 in the insulating wafer 12. The other terminal of this resistor passes through a hole 27 in wafer 12 to the right hand contact spring 17. It will thus be seen that one electrode of the glow lamp is directly connected to one of the contact springs while the other electrode is connected through a high resistor to the other contact spring.

As an example only, resistor 23 may be a carbon resistor having a value of the order of 200,000 ohms.

Fig. 6 shows the electrical circuit of the indicator device of the invention.

In assembling the elements of the indicator device of Fig. 1, the three insulating wafers are so positioned that the correspondingly located slots 5 and the rectangular shaped portions of slots 5' register with each other. Similarly, the four correspondingly positioned rivet holes 3 of the wafers also register with one another. In this way, the various wafers are capable of being fastened together to form a single unit, and the prongs of a plug can pass entirely through all three insulating wafers.

An indicator device in accordance with the design of Fig. 1 was actually constructed and successfully employed in which the wafers 12, 14 and 16 were made of Bakelite material. Wafers 12 and 16 had a thickness of the order of .020 inch, while the central wafer 14 had a thickness of the order of .025 inch. The metallic face plate 10 was also very thin and had a thickness of the order of .025 inch. The overall dimensions of the indicator device followed closely the dimensions of the showing of Fig. 1. The overall thickness of the indicator device was about one-half the showing of Fig. 2.

Figs. 7, 8 and 9 illustrate enlarged views of another embodiment of the invention in which a single molded insulating sheet 30 having a backing plate 31 of insulation material supplants the various wafers of Fig. 1. In practice, the overall dimensions of the indicator device of Figs. 7, 8 and 9 are not appreciably different from those of the device of Fig. 1.

Sheet 30 may be made of Bakelite or other suitable material and is provided with a pair of parallel spaced apertures or slots 32 positioned in locations similar to those of Fig. 1. Apertures 32 are adapted to accommodate contact springs, not shown. At the top of sheet 30 there is a hollow portion 33 which bulges outwardly in order to accommodate a small neon lamp, in turn viewable through an opening 36 in the bulge. Hollow portion 33 is sufficiently long to enable a resistor, not shown, to be positioned to one side of the lamp.

Backing plate 31 is provided with slots 35 registering with the slots 32 but of smaller dimensions. This plate is shown secured at its corners to the sheet 30 by means of tap rivets 34.

The contact springs, glow lamp and resistor have not been shown in Figs. 7, 8 and 9 in order not to detract from the simplicity of the illustrations.

It will be observed that the wafer-like construction of the indicator device of the invention enables the prongs of a conventional cord plug to enter the wall socket or receptacle (after passing through the device) for substantially the entire length of the prongs. Because the contact springs are located within separate slots which are spaced from each other by insulation, it is impossible for these contact springs to touch each other or to engage accidentally an externally located metallic object and thus cause a short circuit. Moreover, the construction of the device is such as to prevent electrical contact with the user.

Although the thin wafer-like indicator device of the invention has been illustrated with rectangular shaped slots for enabling its use with a certain type of plug, it should be understood that the invention is independent of the shape of these slots. The slots may take different shapes to accommodate different types of plug prongs. Thus, if the plug prongs are circular, then the device of the invention will have circular apertures with suitably arranged contact springs to provide good electrical contact with the prongs as they pass through the device.

It should be understood that obvious changes may be made in the shape and design of the indicator device without departing from the spirit and scope of the invention.

What I claim is:

1. Means for furnishing a positive indication that potential is available at the prongs of an ordinary electrical appliance plug when inserted into a wall socket, comprising a relatively small, portable lamp indicator adapted for insertion between the cover plate of a complete wall socket and an ordinary two-prong electrical appliance, said lamp indicator comprising a wafer-like insulating sheet having a pair of spaced apertures through which the prongs of an ordinary two-prong plug may be passed to enter the cover plate of a complete wall socket, contact springs positioned entirely below the inner and outer flat surfaces of said insulating sheet and in said apertures and adapted to make electrical contact with said prongs, a lamp permanently mounted on said sheet, and connections from the electrodes of said lamp to said contact springs, said lamp indicator being devoid of means for permanent attachment to the outlet socket.

2. Means for furnishing a positive indication that potential is available at the prongs of an ordinary electrical appliance plug when inserted into a wall socket, comprising a relatively small, portable lamp indicator adapted for insertion between the cover plate of a complete wall socket and an ordinary two-prong electrical appliance, said lamp indicator comprising three thin, flat insulating sheets secured together to form a single unit, said sheets each having a pair of spaced slots through which the prongs of an ordinary two-prong plug may be passed to enter an outlet socket, correspondingly positioned slots in said sheets registering with one another, contact springs in the slots of the centrally positioned insulating sheet and adapted to make electrical contact with said prongs, said springs being entirely positioned at all times below the outer surfaces of the outer insulating sheets, a lamp permanently positioned on one of the outer insulating sheets, and connections from the electrodes of said lamp to said contact springs.

3. A lamp indicator device adapted for insertion between the cover plate of a complete wall socket and an ordinary two-prong electrical appliance plug comprising three thin, flat insulating sheets fastened together at several points, a pair of spaced narrow slots passing through all of said sheets, said slots being arranged on opposite sides of the center line of said device and having such dimensions as to permit the prongs of an ordinary two-prong plug to pass therethrough, the slots in the centrally positioned insulating sheet being larger than the slots in the outer sheets, a pair of contact springs in the slots of said central sheet, said springs being so constructed and arranged as to make good electrical contact with the prongs of a plug passing therethrough, said springs being entirely positioned at all times below the outer surfaces of the outer insulating sheets, a glow lamp permanently positioned near the top of one of the outer insulating sheets, holes in said one outer sheet located near said lamp, and connections from the electrodes of said lamp passing through said holes to said contact springs.

4. A lamp indicator device adapted for insertion between the cover plate of a complete wall socket and an ordinary two-prong electrical appliance plug comprising three thin flat coextensive insulating sheets, an outer substantially coextensive metallic sheet, rivets securing all of said sheets together to form a single unit, said metal sheet having a relatively large centrally located aperture therein, a pair of spaced narrow slots located within the area bounded by said aperture and passing through all of said insulating sheets and arranged on opposite sides of the center line of said device, said slots having such dimensions as to permit the prongs of an ordinary two-prong plug to pass through said unit, the slots in the intermediate insulating sheet being larger than the slots in the outer insulating sheets, a pair of contact springs in the slots of said intermediate sheet and held firmly in position by said outer insulating sheets, the construction and dimensions of said contact springs and said slots being such that said springs are entirely positioned below the outer surfaces of said outer sheets, said springs being so constructed and arranged as to make good electrical contact with the prongs of a plug passing therethrough, a glow lamp permanently positioned near the top of one of the outer insulating sheets, holes in said one outer sheet located near said lamp, and connections from the electrodes of said lamp passing through said holes to said contact springs, said metallic sheet having an outwardly protruding portion for accommodating said glow lamp and also having a window enabling the glow in said lamp to be seen.

5. A small, portable lamp indicator device adapted for insertion between the cover plate of a complete wall socket and an ordinary two-prong electrical appliance plug comprising three thin, flat insulating sheets secured together to form a single unit, said sheets each having a pair of spaced slots through which the prongs of an ordinary two-prong plug may be passed to enter an outlet socket, correspondingly positioned slots in said sheets registering with one another, contact springs in the slots of the centrally positioned insulating sheet and adapted to make electrical contact with said prongs, said springs being entirely positioned at all times below the outer surfaces of the outer insulating sheets, a lamp permanently positioned on one of the outer insulating sheets, and connections from the electrodes of said lamp to said contact springs, one of said connections including a serially arranged resistor.

6. Means for furnishing a positive indication that potential is available at the prongs of an ordinary electrical appliance plug when inserted into a wall socket, comprising a relatively small, portable lamp indicator adapted for insertion between the cover plate of a complete wall socket and an ordinary two-prong electrical appliance, said lamp indicator comprising a single molded wafer-like insulating sheet having a pair of spaced apertures through which the prongs of an ordinary two-prong plug may be passed to enter an outlet socket, contact springs in said apertures and adapted to make electrical contact with said prongs, said springs being entirely positioned below the surfaces of said sheet, a lamp mounted on said sheet, and permanent connections from the electrodes of said lamp to said contact springs.

7. Means for furnishing a positive indication that potential is available at the prongs of an ordinary electrical appliance plug when inserted into a wall socket, comprising a relatively small, portable lamp indicator adapted for insertion between the cover plate of a complete wall socket and an ordinary two-prong electrical appliance, said lamp indicator comprising a molded insulating sheet having a pair of spaced apertures through which the prongs of an ordinary two-prong plug may be passed to enter the cover plate of a complete wall socket, contact springs in said apertures and adapted to make electrical contact with said prongs, said springs being entirely positioned below the surfaces of said sheet, said molded sheet having a hollow bulging portion with a window therein, a lamp positioned in said hollow bulging portion at the location of said window, permanent connections from the electrodes of said lamp to said contact springs, and a backing plate of insulating material for said molded sheet, said backing plate having spaced apertures registering with the spaced apertures of said molded sheet.

NATHAN SCHNOLL.

REFERENCES CITED

The following references are of record in the file of this patent:

UNITED STATES PATENTS

| Number | Name | Date |
| --- | --- | --- |
| 1,894,697 | Lulki | Jan. 17, 1933 |
| 2,015,698 | Tiffany | Oct. 1, 1935 |
| 2,385,620 | Fleckenstein | Sept. 25, 1945 |

FOREIGN PATENTS

| Number | Country | Date |
| --- | --- | --- |
| 290,814 | Italy | Nov. 30, 1931 |
| 369,899 | Germany | Feb. 24, 1923 |